United States Patent [19]

Maisch et al.

[11] 4,064,482

[45] Dec. 20, 1977

[54] VEHICLE TIRE PRESSURE SUPERVISORY SYSTEM

[75] Inventors: Wolfgang Maisch, Ville d'Avray; Rainer Burkel, Le Chesnay; Jean Pierre Leroy, Paris; André Bonin, Aulnay-sous-Bois, all of France

[73] Assignee: Robert Bosch G.m.b.H., Stuttgart, Germany

[21] Appl. No.: 732,788

[22] Filed: Oct. 15, 1976

[30] Foreign Application Priority Data

Nov. 7, 1975 Germany .............................. 2549946

[51] Int. Cl.² ............................................ B60C 23/02
[52] U.S. Cl. ................................... 340/58; 200/61.25
[58] Field of Search ............. 340/58; 200/61.22, 61.25

[56] References Cited

U.S. PATENT DOCUMENTS

| 3,092,806 | 6/1963 | Field | 340/58 |
|---|---|---|---|
| 3,374,460 | 3/1968 | Massoubre | 340/58 |

*Primary Examiner*—Alvin H. Waring
*Attorney, Agent, or Firm*—Flynn & Frishauf

[57] ABSTRACT

The wheels at opposite ends of an axle - and which may be twin or tandem wheels — each have a pressure switch and a tank circuit associated therewith, rotating with the wheel. The tank circuits includes a normally closed pressure-sensitive switch which, when the pressure in the respective tire drops below a certain value, opens the tank circuit. The coil of the tank circuit is coupled with a transducer coil connected to a blocking oscillator which, upon passage of the tank circuit, provides an output pulse. The frequency or recurrence rate of the output pulses from opposite ends of the wheels at an axle are compared in an integrating comparator and, if the frequencies differ after a predetermined integration time, provide an alarm signal. The integrator or a digital counter which should have a number of count stages, only the last one providing an alarm signal to allow for variation in frequency with normal tire pressure when the vehicle rounds a curve. Tandem or multiple wheels at one end of the axle each can be provided with a tank circuit, offset 90° with respect to each other, however. Use of tandem wheels increases the absolute frequency and does not change the comparison system.

14 Claims, 8 Drawing Figures

VEHICLE TIRE PRESSURE SUPERVISORY SYSTEM

Cross reference to related application: DENAMPS et al, Ser. No. 730,634, filed Oct. 7, 1976 assigned to the assignee of the present application.

The present invention relates to a system to supervise vehicle tire pressure, and more particularly to such a system in which each wheel has associated therewith an energy absorbing circuit, typically a tank circuit, coupled with a fixed coupling transducer coil, the tank circuit being opened or closed in dependence on tire pressure.

The lifetime of vehicle tires is greatly influenced by tire pressure, besides loading and vehicle speed. Loading and vehicle speed are under control of the operator; the tire pressure cannot be checked continuously, however, during operation of the vehicle. Design tire pressure should be accurately maintained. If the tire pressure is too low, the structure of the tire is damaged by excessive kneading; further, the tire will heat unduly, thus further decreasing the strength of the tire structure and also leading to rapid deterioration thereof.

Electrical tire pressure warning systems have previously been proposed using a pressure sensitive switch which is connected to a damped oscillator. If the tire pressure is too low, the oscillator ceases oscillating. The drop in tire pressure can then be indicated in an evaluation circuit connected in inductively coupled relation to the blocking oscillator. The tire pressure sensing system and the evaluation circuit are used and engaged only if one of the switches associated with the tires indicated that the pressure in the respective tires is too low.

This system has the disadvantage that failure of the oscillator itself will not recognized, that is, the system is not fail-safe. The evaluation circuit took a comparatively long time to determine drop in tire pressure until a warning signal was given.

It is an object of the present invention to provide a system or supervision of tire pressure in vehicle wheels which provides an indication to the driver that the system is ready to function, functions properly and, when in use, provides rapid indication of loss of tire pressure.

Subject matter of the present invention

Briefly, blocking oscillators are located in the vehicle frame, coupled to tank circuits which are opened or closed, in dependence on whether tire pressure is too low or proper. If the tire pressure is too low, the circuit is opened and the blocking oscillator coupled to the fixed transducer will not provide an output signal. The blocking oscillators are connected to evaluation circuits which receive signals not only from the associated wheel, but also from the wheel at the opposite end of the axle, and effect a frequency comparison. The evaluation circuit preferably has integrating characteristics to integrate frequency comparison over a number of cycles and thus compensate for possible short-time variations if the vehicle rounds a curve.

In accordance with a feature of the invention, the evaluation circuits associated with each end of the vehicle axle include a resettable integrating stage in which the pulses derived from the transducer pick-ups, that is, the blocking oscillator signals, are summed; the summed signals are reset by reset signals derived from the transducer at the other end of the axle.

Before starting a trip, that is, each time when the starter switch is operated, for example, a signal is derived which indicates operability of the system. When the vehicle moves, a warning signal is derived only if one of the tires has a pressure below a predetermined value. If the vehicle is stopped, there will be no frequencies to be compared and hence a "ready" signal can be provided.

The two pulse trains derived from the wheels at opposite ends of the axle are compared as to their frequencies. Frequency comparison of two pulse trains is particularly suitable since one may assume that the tires of wheels of one axle do not simultaneously have the same defect, so that one wheel can be used as a reference for the other. Frequency comparison is particularly suitable since tandem or twin wheels at one end of the axle can eadily be sensed. Each one of the tandem wheels has a tank circuit associated with a single transducer and offset with respect to the tank circuit of the other wheel, for example by 180°. This does not change the concept of the system since the frequency which is to be compared then will merely be a whole multiple of that frequency if only a single tire is used at the end of an axle. Preferably, the transducers associated with the wheels at opposite ends of the axle are offset with respect to each othr by 90°.

The invention will be described by way of example with reference to the accompanying drawings, wherein.

Figure 1:
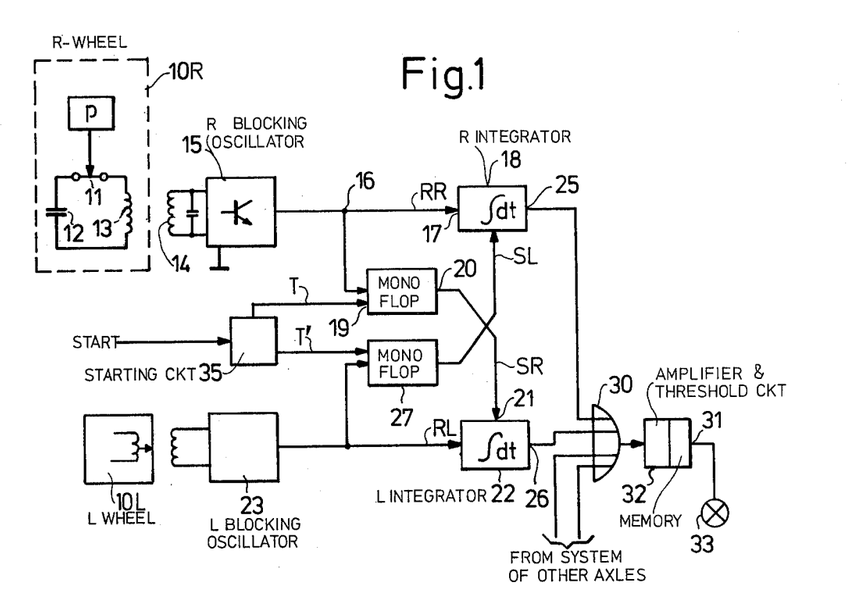
FIG. 1 is a schematic block circuit diagram of the system in accordance with the present invention.

Each wheel or, rather, each tire, has a transducer system associated therewith which includes a tank circuit formed by capacitor 12, inductance coil 13 and pressure switch 11. The system 10R for the right wheel is shown in FIG. 1 in detail; the pressure switch 11 is normally closed. It opens when the pressure drops below a predetermined level. Coil 13 is so located on the wheel of the vehicle that it can be coupled with a coil 14 of the tank circuit of a blocking oscillator 15 which is fixed on the frame of the vehicle. Blocking oscillator 15 has its output connected to a junction 16 which connects to two terminals; the right reset RR terminal 17 of an integrator 18 and to the SET input of a monostable multivibrator (MMV) or mono-flop 19. The output of the MNV 19 is connected to the setting connection 21 of integrator 22 which has its reset input RL coupled to a blocking oscillator 23 similaar to blocking oscillator 15. Blocking oscillator 23 is coupled to a tank circuit 10L associated with the left wheel. The output of oscillator 23 is connected to an MMV 27 similar to MMV 19, which MMV 27 is in turn connected to the left set SL terminal of integrator 18. A starting circuit 35, having a starting pulse applied at its input has two output terminals T, T' which are connected, respectively, to additional setting inputs of the MMV's 19, 27. The outputs 25, 26 of the integrators 18, 22 are connected to an OR-gate 30 to which also other inputs from other similar integrators associated with tire pressure sensing systems of other axles can be connected, as shown schematically. The OR-gate is connected to an amplifier and threshold circuit 32 which may include separately, or as part thereof, a memory portion 31, the output of which is connected to an indicator 33. The memory can be short-time, for example a monostable flip-flop or a self-holding circuit with an interrupt override. Thus, memory 31 may be no more but a self-holding circuit or switch. Besides the oscillators 15 and 23, each one of the systems associated with each wheel includes an amplitude demodulator and a pulse or wave-shaping circuit which provides output pulses only if oscillators 15, 23, respectively, are damped, so that the oscillating amplitude decreases or blocks. These circuits are inherent in the oscillators 15, 23 which may be blocking oscillators having an output tank circuit for oscillation and, upon presence (and closed circuiting) of the wheel tank circuit 10 block and provide an output signal.

The memory 31 is used particularly if the system is associated with tandem or multiple tires. When used with tandem tires, the warning signal will appear only periodically at the output. To provide for a constant warning signal, however, the missing time is bridged by the memory 31, preferably an MMV. The timing of the MMV is so dimensioned that a warning lamp provides constant output, for example, to a speed of down to 8 km/h (about 5 mph); when the vehicle moves still slower, it will flash. If the lamp is fully illuminated at a stopped vehicle or not depends on the relative position of the respective wheels and the transducers. The effect thereof will be discussed below.

Self-checking of the circuit is provided; to cause indicator lamp 33 to light before starting the vehicle, threshold and amplifier circuit 32 must have responded, which requires a predetermined value in at least one of the integrating stages 18, 22, or others from other axles. The integrating stages are charged from starting circuit 35, terminals T, T', to provide a malfunction signal, for example only during starter operation, indicating that the circuit is operating properly. The starting circuit 35 is connected to the MMV's 19, 27. It may, in a simple form, be a differentiating circuit which provides a pulse upon operation of the starter switch, for example when the starter switch is turned on. If the MMV's 19, 27 have a sufficiently long unstable time, and no reset pulse is derived from the other blocking oscillators 15, 23, indicator lamp 33 will light, thus indicating to the operator that the system is operating properly to supervise tire pressure.

Figure 2:
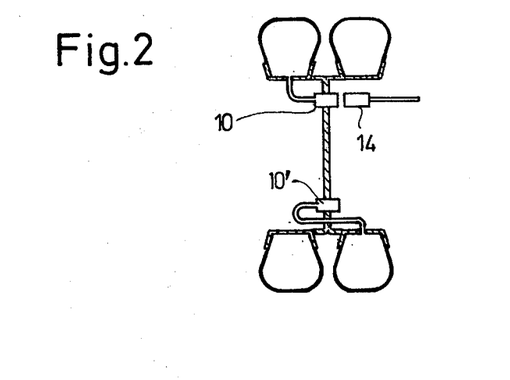
FIG. 2 is a schematic illustration of the transducer arrangement with twin or tandem tires.

FIG. 2 illustrates, schematically, the arrangement of the moving transducer elements 10, 10' when using tandem tires. The transducers 10, 10' are offset 180° with respect to each other. Thus, pulses at double frequency will be derived from the output of the respective blocking oscillator.

Figure 3:
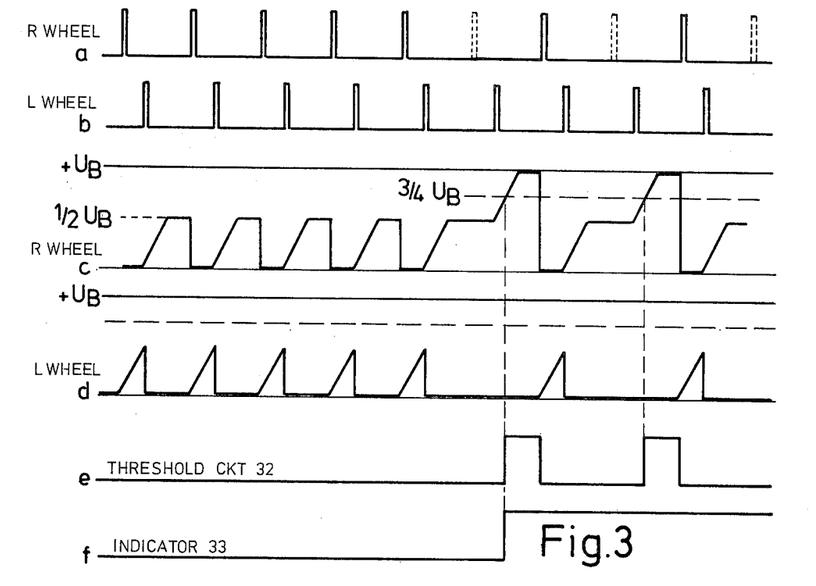
FIG. 3 is a series of pulse diagrams to illustrate the operation of the system in accordance with FIG. 1.

Operation, with reference to FIG. 3, of the system of FIG. 1, using twin tires as shown in FIG. 2: The frequency of the pulses upon damping on the oscillators will be a double frequency, as illustrated in lines a and b of FIG. 3. For purposes of this explanation it will be assumed that the vehicle operates on straight track; the effect of curves will be considered later. The pulses from wheels at opposite ends of the axle and derived from oscillators 15, 23 are shifted by half a pulse period. At normal air pressure, the pressure sensitive switch 11 is closed, and the output of the oscillators 15, 23 will have the corresponding pulses. If one of the twin tires in a wheel loses pressure to an extent that the pressure sensitive switch 11 responds, then the corresponding pulses will be missed; this is indicated in line a of FIG. 3 by the pulses in broken line. The diagrams of lines c and d illustrate the integrating values in the integrating stages 18, 22, in temporally correct relationship with respect to the pulses in lines 3a, 3b. If the line 3a is associated with the right wheel, and the line 3b with the left, then the curve of line c, FIG. 3, will correspond to the integrated values of the integrating stage 18 associated with the right wheel; the curve of the graph of line d of FIG. 3 will correspond to the integrator 22 associated with the left wheel. As can be seen, a pulse from the associated oscillator cancels the integrated value, that is, resets the integrating stage of the associated side and effects charge of the integrating stage associated with the opposite wheel. If the pulses in broken line of graph a of FIG. 3 are missed, no reset of the associated integrator will occur and the storage content of the respective integrating stage can rise above a value which is above the threshold response level of the amplifier and threshold circuit 32. An output signal will be derived from the threshold switch as indicated in line e of FIG. 3, indicating insufficient tire pressure.

The integrators are so set, as illustrated in the graph c of FIG. 3, such that the threshold is at about 75% of the maximum integration value; the integration value of the integrating stage is increased with each pulse by 50% of the maximum value.

The memory circuit 31 is provided to supply a constant output at indicator 33. If the amplifier and threshold circuit is connected directly to the indicator without the memory circuit, the indicator will flash, as shown by the broken lines.

The maximum integration value is shown in FIG. 3, lines c and d, at $+U_B$; the integrating value at each pulse then will be $\frac{1}{2} U_B$, the threshold level being indicated by the broken lines $\frac{3}{4} U_B$.

Figure 4:
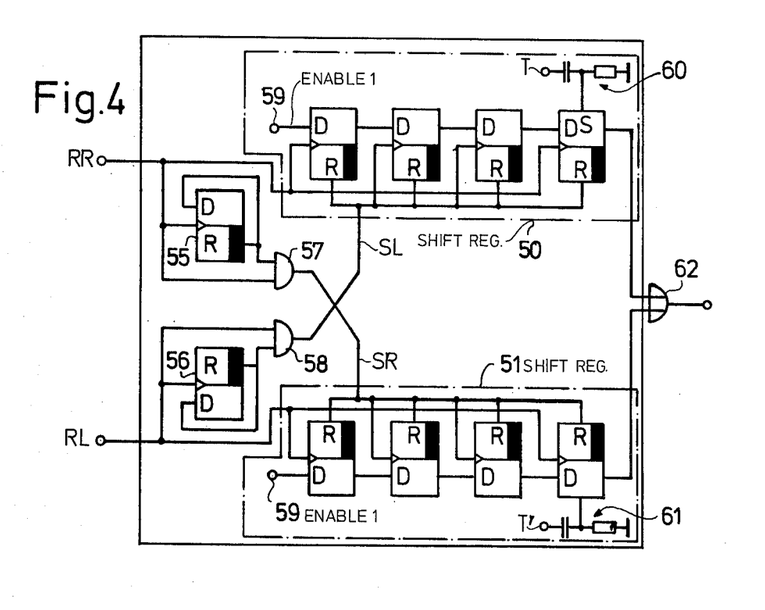
FIG. 4 is a fragmentary diagram illustrating another embodiment of the system and using digital technology.

Embodiment of FIG. 4: Basically, the system is identical to that of FIG. 1, but the integrating stages 18, 22, rather than being analog integrators, operate digitally; the integrators, as shown in FIG. 4, are formed by four-stage shift registers 50, 51 operating as counters They are connected to terminals RR and RL (FIG. 1). Frequency comparison is effected by pure digital circuitry. Each blocking oscillator 15, 23 has a counter circuit 50, 51 associated therewith which is capable of five switching states. If the last switching state or count state is reached, an alarm or low-pressure signal will be indicated. In ordinary operation, that is, when tire pressure is normal, every second pulse resets the counter of the opposite side to null.

The shift register is constructed as a four-stage register, permitting five switching states, as a compromise between rapid indication of low pressure and the possibility that, if the vehicle goes through a sharp curve, pulses of oppositely located wheels on one axle may occur with different frequency. Actual experience has shown that when passing through very tight curves, a pulse shift may occur so that the various shift registers are charged up to the penultimate stage, that is, to the third register, or storage, or count state. Even extremely tight curves did not, however, cause a frequency difference upon which the counter counted to the fourth count state. The five count states, therefore, provide for reliability without excessive material and permit passage through curves. The warning signal is given only when the last or fifth count state is reached.

Each wheel has a four-stage shift register 50, 51. The input 59 having the SR signal (FIG. 1) applied causes shifting by one stage at each pulse from the oscillator, if the input at enabling terminal 59 is a logic 1-signal. The fourth stage is reached by a logic 1-signal only in case of pressure loss in the tire. In that case, the OR-gate 62 will pass a signal to the warning circuit; OR-gate 62 corresponds to OR-gate 30 of FIG. 1. The two bistable flip-flops (FF) 55, 56 operate as 2 : 1 frequency dividers and, with the associated AND-gates 57, 58 suppress every other pulse from the blocking oscillator in order to obtain the reset pulses for the opposite side.

Figure 5:
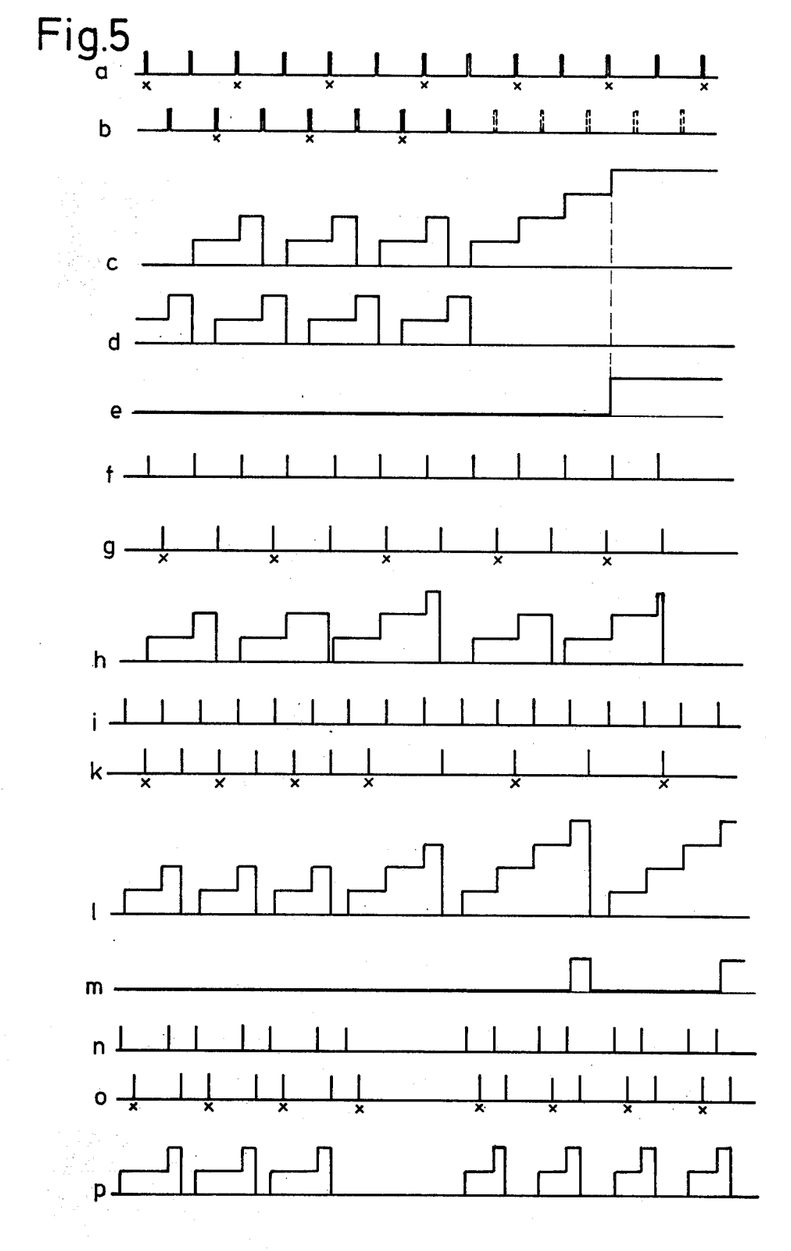
FIG. 5 shows a series of pulse timing diagrams illustrating the operation of the system in accordance with FIG. 4.

Operation, with reference to FIG. 5: Pulses derived from the blocking oscillator are shown; suppressed reset pulses have an $x$ associated therewith.

Upon starting the system, the SET inputs of the two last shift register stages receive a short pulse over R/C circuits 60, 61, and provide an output which simulates a tire defect, so that the operability of the system can be checked. A defect indication disappears as soon as the vehicle starts if the tires are in order and if all shift registers receive a reset pulse over the AND-gates 57, 58.

Let it first be assumed that the vehicle has single tires on all axles. The pulse diagrams under this condition are shown in graphs $a$ through $e$. As shown by the broken pulses in line b of FIG. 5, a defect occurs at the time when the eighth pulse should have been sensed. The right tire is in order. The counter for the right wheel, as shown in line c, is not reset anymore; the shift register for the left side, as seen in line $d$, does not receive any pulses anymore. The output signal, indicating an alarm signal, is shown in e of FIG. 5.

The foregoing assumed that the vehicle is operating in a straight line. Let it be assumed, now, that the vehicle operates in a curve; the respective pulses are shown in lines $f$ through $h$.

The frequency for the right wheel, line $f$, increases and becomes greater than that for the left wheel, as shown in line $g$. The counters will have different count states. Line $h$ illustrates the register condition for the right wheel. Since the threshold value is, however, the highest register state, no output signal indicative of tire defect will obtain. As above discussed, a shift register having four register positions is sufficient since, even in tight curves, it has been found that only three register positions will be seized if the tires are in order.

The system of FIG. 4 is equally adaptable to twin or tandem tires, and the corresponding operating diagrams are shown in lines $i$ through $m$. Line $i$ of FIG. 5 shows the pulse sequence for the right wheel, line $k$ the pulse sequence for the left wheel. Since every other pulse only is sensed, the shift register for the left wheel will reach its highest register state, as shown in line 1 and, as shown in graph $m$, will provide a signal indicative of low pressure. Since the alarm signals, as seen in line $m$, occur only periodically if tandem tires are used, one of these signals is applied to a flip-flop or memory circuit 31, connected to OR-gate 62 (FIG. 4). This may be a bistable flip-flop to provide a continuous output, or a monostable flip-flop having an ustable time which, at higher wheel speed, bridges sequential pulses, but at lower wheel speed provides a flashing output of sufficient duration so that the flashes can energize indicator lamps and will not be missed.

The pulse diagrams discussed utilized a phase shift of 180° of pulses with respect to oppositely located vehicle wheels. If the pressure sensors are unsymmetrically located on the tires, a signal with lesser respective distances will be provided. The lines $n$ through $p$ of FIG. 5 illustrate this situation. Lines $n$ and $o$ show the pulse sequences of both wheels. Line p, at the left side, illustrates pulses at the shift register 50 and, at the right side, pulses for shift register 51, ssuming proper tire pressure; as can be seen, the pulse widths will differ but there is no basic change in operation.

The circuit arrangement of FIG. 4 illustrates a system which may be of disadvantage if tandem tires are supervised; in tandem tires, the warning signal at the output of the OR-gate 62 appears only periodically. Since the warning indicator should provide a continuous signal, the missing time is bridged by a flip-flop. If the flip-flop is monostable, the unstable time can be so arranged that down to about 8 km/h, a constant warning signal is provided; at lower speeds, the indicator begins to flash. An indication from the indicator when the vehicle is stopped, however, will be obtained only if the wheel position is such that the transducer is coupled to the tank circuit on the wheel. Thus, the specific wheel position of the vehicle will govern the output at that time. If the vehicle should stop just when a logic 1 appears at the output of the fourth shift register, the lamp will light; if, however, a logic 0 appears at the shift register, the lamp will extinguish after the unstable time of the flip-flop has terminated, although a tire defect is present. This is undesirable since the operator may be led to believe that the defect has cleared itself. This difficulty can be overcome by a self-holding circuit, or by the circuit in accordance with FIG. 6.

Figure 6:
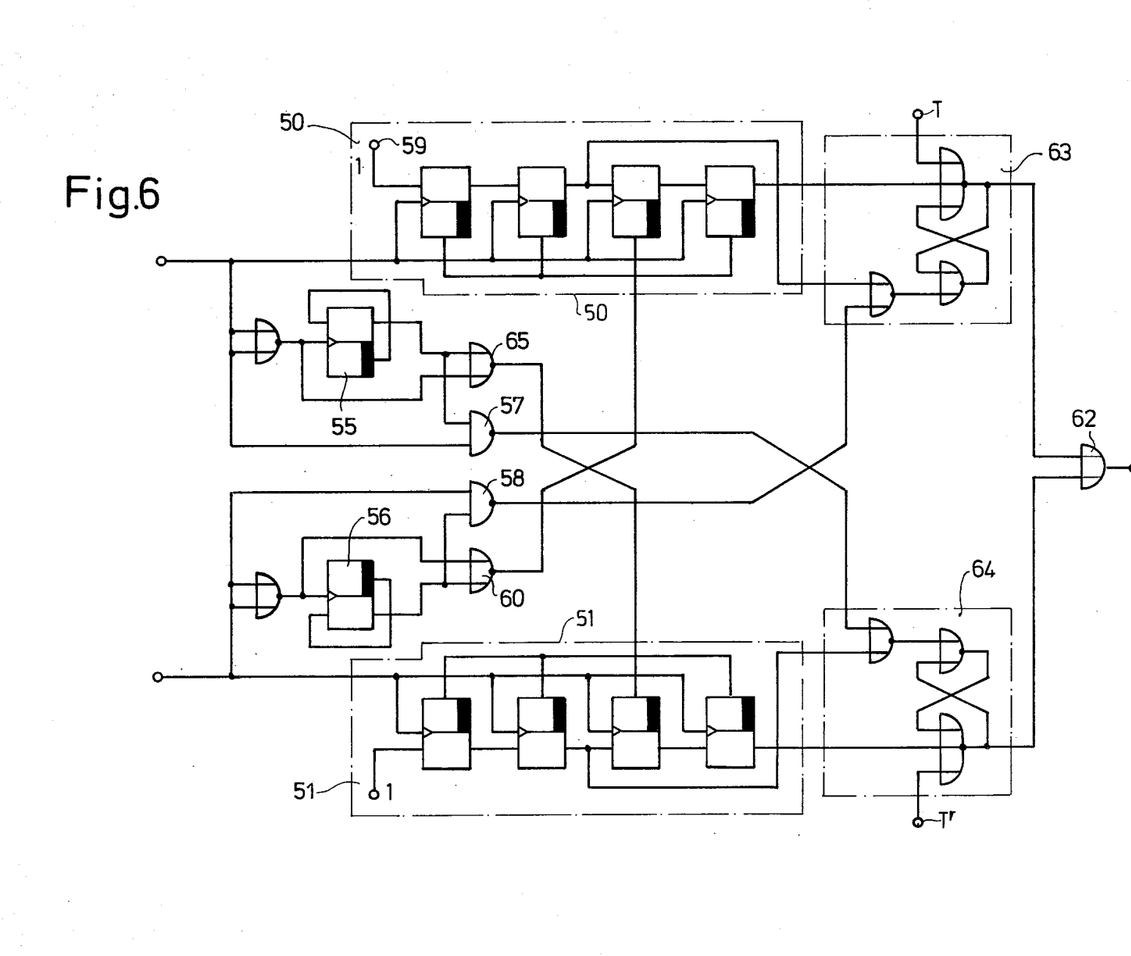
FIG. 6 is a fragmentary schematic diagram of another embodiment of the invention.

Embodiment of FIG. 6: This embodiment generally corresponds to that of FIG. 4 and like parts have been given like reference numerals and will not be explained again. The last stage of the shift registers 50, 51 are connected to respective bistable stages 63, 64 which are SET if an error signal is derived from the respective shift register 50, 51. The error signal will thus be continuous. If may occur that an error signal is indicated although no tire defect actually has occurred; this may happen if stray pulses are propagated through the system or, for example, upon parking and repetitive forward-reverse movement over tight-curved paths. The bistable flip-flops 63, 64 are reset by utilizing the previously suppressed reset pulses connected over NAND-gates 65, 66 to the bistable flip-flops 63, 64. Thus, to reset the bistable flip-flops 63, 64, only those pulses are used which occur if only the first storage position of the shift register has a logic 1-signal thereon. The bistable flip-flops 63, 64 can also be used to introduce a simulated error signal by connecting a simulating input T, T' to the starting circuit, as shown in connection with FIG. 1. The bistable flip-flops 63, 64 are then SET upon operation of the starter circuit, thus triggering a warning signal, the stages being RESET as soon as the wheels move.

Figure 7:
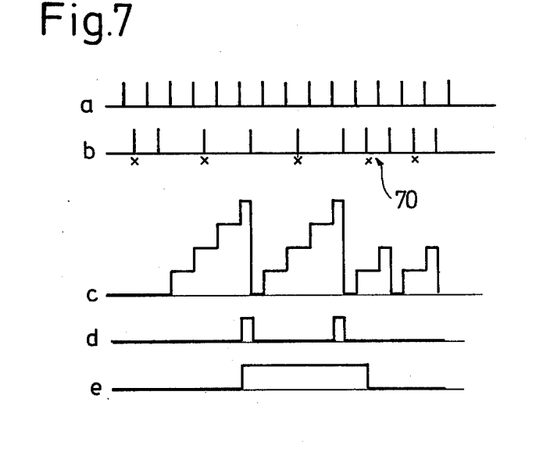
FIG. 7 illustrates timing diagrams of pulses occurring in the system of FIG. 6.

Operation, with reference to FIG. 7: Line a of FIG. 7 shows the pulse sequence of one wheel, and line $b$ the pulse sequence of the other. Let it be assumed that the wheel $b$ has a defect appear thereat; the pulse sequence, as shown in line $b$, will then have gaps, and the associated integrating stage - in accordance with FIG. 6, counter 50, 51, respectively will not be reset anymore and the counter will reach the threshold value as shown in line c of FIG. 7, that is, the fourth register position will be occupied, or seized. As a consequence, warning signals as illustrated in graph d, will occur. By use of the subsequently connected flip-flops 63, 64, the pulses will be converted into a continuous pulse, as shown in line e. Since the defect did not persist, however, a pulse 70 (FIG. 7, line b) will reset the associated flip-flop and extinguish the warning signal.

The system of the present invention is applicable not only to unitary vehicles, but also to tractor-trailer combinations, aand to multiple-tractor units. In such arrangements, information transmission causes a problem, especially the transfer of information from the trailer to the tractor, since the number of transmission lines between the tractor and trailer is limited. In particular, the system must be compatible with existing couplers between tractor and trailer, or other multiple elements. In accordance with a feature of the invention, only a single line is needed (besides return or ground line) to provide both energy for the switching arrangement as well as for information transmission, the information transmission signals being superimposed on the supply voltages.

Figure 8:
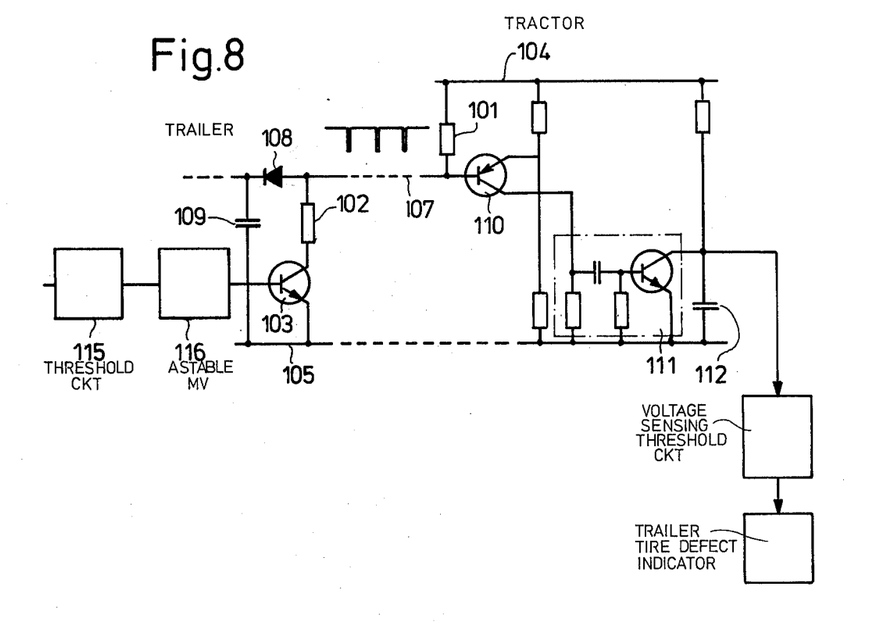
FIG. 8 is a schematic fragmentary diagram of the system when used to transmit information from a separable trailer to a tractor.

Referring to FIG. 8: The tractor has a positive supply line 104; both tractor and trailer have a common or chassis bus 105. The connection between tractor and trailer is indicated by the broken line 107. The main supply bus 104 from the tractor has a resistor 101 connected in series therewith before being coupled to the supply line of the trailer. A transistor 103 and a collector-resistor 102 are connected to the trailer supply line 107. Line 107 forms both the information transmission as well as energy supply line between the tractor and trailer. A diode 108 and a smoothing capacitor 109 are connected, as shown, to provide a smooth output voltage. The tractor has a transistor 110 connected between positive bus 104 and chassis bus 105, the emitter of which is connected to the tap point of a voltage divider formed by two resistors. A capacitor 112 is connected between the positive bus 104 on the tractor side and chassis bus 105, to which a discharge 111 is connected controlled by the transistor 110.

Transistor 103 is controlled by an astable multivibrator 116 which, in turn, is controlled by a threshold circuit 115. The astable multivibrator 116 is provided instead of the indicator 33 (FIG. 1), the threshold circuit 115 corresponding to amplifier and threshold circuit 32 (FIG. 1) or, respectively, corresponding to the output of OR-gate 62 (FIG. 4). The astable multivibrator 116 oscillates if the pressure in all tires is sufficiently high; it ceases oscillating when circuit 32 or OR-gate 62 responds, that is, when the pressure switch in one of the vehicle wheel tires should open. Information transmission from the trailer to the tractor is effected by sensing the voltage supply for the electronics by the transistor 103 when operating normally. This is sensed in the tractor electronics by constant discharge of the capacitor 112. If the oscillations on line 107 should cease, the capacitor will not be discharged and it will reach a charge state which causes a subsequently connected threshold circuit to respond and provide an indication of loss of tire pressure in the trailer.

The system is self-cancelling; if the trailer is disconnected it is not necessary to provide any changes in the circuitry. To inhibit constant indication of the indicator in the tractor, the average voltage drop at resistor 102 is sensed and the discharge circuit 111 so arranged that the voltage of the capacitor 112 is below the response threshold value of the voltage sensing threshold circuit if no trailer is coupled to the tractor.

A suitable pressure sensitive switch is shown in cross referenced application Ser. No. 730,634, filed Oct. 7, 1976, DENAMPS et al, assigned to the assignee of the present application, to which reference is hereby made.

Various changes and modifications may be made, and features described in connection with any one of the embodiments may be used with any one of the others, within the scope of the inventive concept.

We claim:

1. Vehicle tire pressure supervisory system for a vehicle having at least two wheels, one each located at opposite ends of an axle, and having a switch (11) located at each wheel and changing state when the tire pressure in the respective wheel drops below a predetermined level;

network means (12, 13) located at each respective wheel and controlled by the state of the switch (11);

coupling transducers (14, 15; 23) located on the vehicle in sensing relation to the respective network means of the wheels and sensing the circuit state of the associated network means and hence the state of the respective switch and hence the tire pressure said coupling transducers providing sequential output pulses, the frequency of which is a function of tire pressure;

and comprising, in accordance with the invention, an evaluation circuit (18, 22) associated with each of the wheels at the ends of the axle and connected a. to the coupling transducer (23) associated with the respective wheel at the opposite end of the axle, and b. to the coupling transducer (14, 15) of the respective wheel at the associated end of the axle, said evaluation circuit including means sensing the respective frequencies of the output pulses from the coupling transducers at opposite ends of an axle and frequency comparator means comparing the frequencies of the pulse sequences derived from the frequency sensing means and transduced by the coupling transducers of the wheels at opposite ends of the axle and providing an output if the frequency difference exceeds a predetermined level.

2. System according to claim 1, wherein the network means (12, 13) located at the respective wheels comprise energy absorbing circuits;

and the coupling transducers include oscillators (15, 23) coupled to the energy absorbing circuits which, upon passage of the energy absorbing circuit, dampen the oscillator to provide an output pulse each time when the oscillator is damped to cease oscillations.

3. System according to claim 2, wherein the network means (12, 13) comprise a tuned L/C circuit selectively closed by said switch (11), and the oscillator (15, 23) comprises a blocking oscillator.

4. System according to claim 1, wherein
the evaluation circuit comprises a resettable integrator (18, 22) integrating the pulses derived from one of wheels and being reset by the pulses derived from the other of the wheels, said resettable integrator forming both the frequency sensing means and the frequency comparator;

and alarm signal generating means (30, 32, 33; 62) providing and output alarm sign-al when the integrated value in the integrator reaches a predetermined level.

5. System according to claim 4, wherein (FIGS. 4, 6) the resettable integrator comprises a counter, the alarm signal being generated when a predetermined count state is reached.

6. System according to claim 4, wherein (FIG. 1) the resettable integrator is an analog storage integrator providing an output signal when a predetermined storage state is reached.

7. System according to claim 4, further comprising a monostable flip-flop (31) connected to the alarm signal generating means and bridging pulse gaps by the alarm signal generating means to provide a continuous alarm signal if the repetition rate of the signal from the alarm signal generating means is shorter than the unstable time of the monostable FF, and a flashing signal if the signal from the alarm signal generating means has a longer repetition rate than said unstable time.

8. System according to claim 4, further comprising (FIG. 6) a bistable flip-flop stage (63, 64) connected to the integrator (18, 22; 50, 51) and being SET by the alarm signal to provide a continuous warning signal, the bistable flip-flop stage being RESET upon occurrence of pulses from the coupling transducers indicative of normal tire pressure.

9. System according to claim 1, further comprising connection means (35, T, T1, 60, 61) connected to the operating switch of the vehicle and to the evaluation circuit and simulating a failure of comparison by the frequency comparator means to provide said output as a warning system check indication, the output being cancelled upon proper operation of the tires and rotation of the wheels.

10. System according to claim 1, wherein, to render the system fail-safe, the coupling transducers, the network means and the switch are respectively so connected that malfunction in any one of the coupling transducers, the network means or the switch results in response by the evaluation circuit similar to response to pressure below a predetermined level in one of the tires.

11. System according to claim 1, for use with tandem or twin wheels, wherein the individual wheels at respective ends of the axle are offset with respect to adjacent wheels at the same ends of the axle by an angle of 360° divided by the number of wheels at one end of an axle.

12. System according to claim 1, for use with a tractor-trailer vehicle combination comprising a supply line connected between the tractor and the trailer for supplying electrical energy to the trailer;

and connection means superimposing information data on said supply line located on the trailer, and means sensing the information data superimposed on said supply line on the tractor, and providing output signals in accordance with said information data.

13. System according to claim 12, wherein the connection means comprises chopper means (116, 103) connected to the supply line (107) to the trailer, and means (110, 111, 112) sensing chopped voltage pulses on the supply line (107) located on the tractor.

14. System according to claim 4, wherein the resettable integrators, each, have a pulse integrating input (18: SL; 22: 21, S R) an a reset input (18: 17, R R; 22: R L), the integrator associated with one wheel having its reset output connected to the coupling transducer of said one wheel and its integrating input connected to the coupling transducer of the other wheel so that the integrator will be continuously set and reset if the frequencies from said coupling transducers are essentially equal and will accumulate an integrated value if the frequencies differ.

* * * * *